United States Patent Office 3,649,530
Patented Mar. 14, 1972

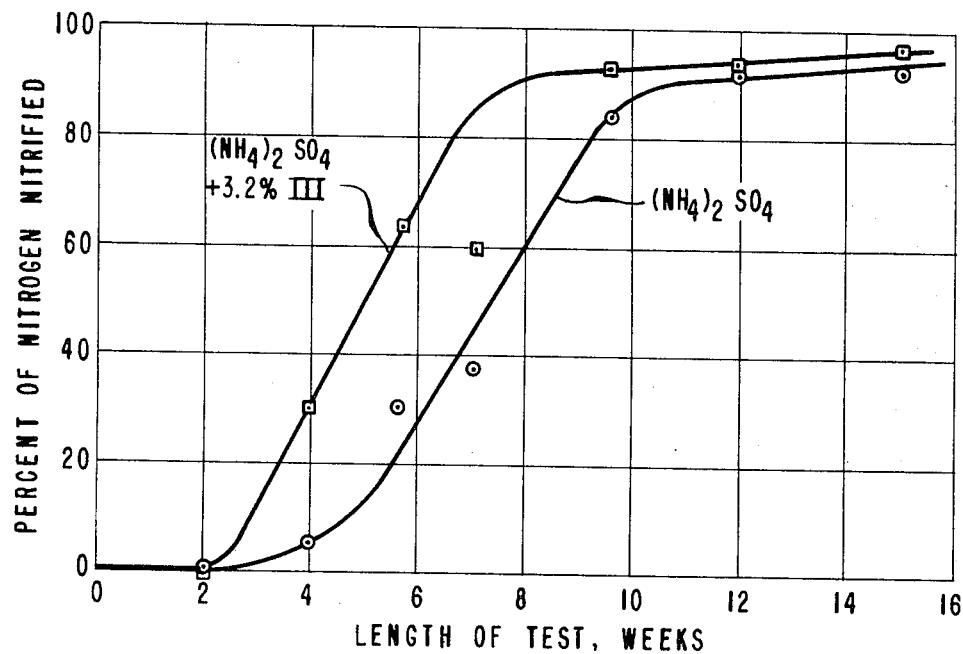

3,649,530
METHOD OF INCREASING THE BENEFICIAL OXIDATION OF A BIOLOGICAL SUBSTRATE WITH 2-AMINOBENZIMIDAZOLE DERIVATIVES
Norman R. Kouba, Wilmington, Del., assignor to E. I. du Pont de Nemours and Company, Wilmington, Del.
Continuation-in-part of application Ser. No. 714,719, Mar. 20, 1968. This application July 1, 1970, Ser. No. 51,656
Int. Cl. C02c *1/00*
U.S. Cl. 210—11
4 Claims

ABSTRACT OF THE DISCLOSURE 2-aminobenzimidazole compounds of the formula:

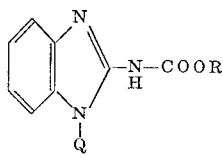

wherein Q and R are as defined hereinafter, can be used to increase the rate of biological oxidation for both sewage and agricultural fertilizers.

Exemplary of the compounds of the above formula is 1 - (butylcarbamoyl) - 2-benzimidazolecarbamic acid, methyl ester.

CROSS-REFERENCE TO RELATED APPLICATIONS

This application is a continuation-in-part of my copending application, Ser. No. 714,719, filed Mar. 20, 1968, now abandoned.

BACKGROUND OF THE INVENTION

Sewage is a dilute aqueous mixture of organic wastes containing proteins, fats, carbohydrates and other complex organic molecules. It is common practice to collect municipal sewage and send it to a sewage treatment plant. The function of the plant is to decompose organic and inorganic wastes to simpler molecules such as carbon dioxide, water, nitrates, etc., thereby returning needed elements to the environment and preventing pollution of natural water sources.

There are two common techniques that are used in present sewage treatment plants for increasing the rate of decomposition of organic wastes. These are the use of a trickling filter and the use of aeration tanks. In both techniques when the sewage supply and the air supply are increased, a favorable environment for increased oxidation rates is provided. Consequently, the decomposition of the wastes is accomplished in a shorter length of time and results in a more rapid decrease in the oxygen demand of the effluent stream.

The rate at which the nitrogen in a fertilizer is converted into usable plant food is also of economic importance. For optimum results, a nitrogenous fertilizer should be converted into nitrates at a rate which is similar to the plant's growth rate.

The rate of conversion into nitrates is closely tied to the ambient temperature and becomes very slow when the temperature drops to 45° F. or lower. Consequently, in cold climates where the growing season is short, there may be a need to speed up the rate of conversion into nitrates. As a result, fertilizers which are applied at the time of seeding will be rapidly and completely converted into nitrates and will stimulate the plant to grow faster. This earlier increase in growth due to nitrate availability can result in quicker plant maturity.

SUMMARY OF THE INVENTION

This invention relates to the treatment of sewage, soil and other biological substrates in which natural oxidation processes occur and result in a beneficial service for man. More specifically, it relates to the addition of benzimidazole compounds to the substrate for the purpose of increasing the rate and magnitude of the natural oxidation process. Thus the addition can result in a more rapid reduction in oxygen demand in the treatment of sewage or it can increase the oxidative processes for converting fertilizer nitrogen into nitrates.

DESCRIPTION OF THE DRAWING

The figure is a graph illustrating that the nitrification of $(NH_4)_2SO_4$ is increased by the addition of a benzimidazole compound. This figure is described in greater detail in Example 13.

DETAILED DESCRIPTION OF THE INVENTION

Specifically, one embodiment of this invention adds another dimension to the techniques for increasing the decomposition of sewage. In this instance, the addition of benzimidazole compounds to sewage increases the rate of oxygen consumption in the sewage and thereby reduces the oxygen demand of the effluent stream. The benzimidazole compounds can be added to trickling filters or aeration tanks in modern sewage treatment plants to effect a more rapid decomposition of sewage than has heretofore been possible. By increasing the rate of decomposition of sewage, greater throughputs can be achieved in existing plants, and lower capital investments will be required in new plants.

Further, the addition of benzimidazole compounds to soil results in a more rapid and complete conversion of fertilizer nitrogen into nitrates. Benzimidazole compounds may be mixed with granular or liquid fertilizers and applied in the usual manner or applied separately. The benzimidazole compounds can also find application as fertilizer additives in areas where the conversion into nitrates is slow, such as in newly reclaimed desert soil.

The useful benzimidazole compounds are exemplified by the following formula:

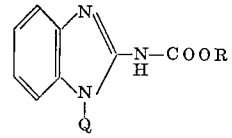

wherein R is alkyl of 1 through 4 carbon atoms;

Q is hydrogen, —COOR, or

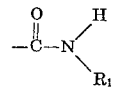

$R_1$ is alkyl of 1 through 8 carbon atoms; alkenyl of 3 through 10 carbon atoms; phenyl; phenyl substituted with methyl, ethyl, methoxy, ethoxy, nitro, cyano or halogen; benzyl; benzyl substituted with methyl, nitro, methoxy or halogen; cyclohexyl; cyclohexyl substituted with methyl; or (cycloalkyl) alkyl of 7 through 8 carbon atoms.

Preferred within the above formulae are the compounds:

1-(butyl carbamoyl)-2-benzimidazolecarbamic acid, methyl ester
1-methoxycarbonyl-2-benzimidazolecarbamic acid, methyl ester
2-benzimidazolecarbamic acid, methyl ester The following specific compounds can be used in the processes of the invention.

1-(methyl carbamoyl)-2-benzimidazolecarbamic acid, methyl ester
1-(ethyl carbamoyl)-2-benzimidazolecarbamic acid, methyl ester
1-(propyl carbamoyl)-2-benzimidazolecarbamic acid, methyl ester
1-(isopropyl carbamoyl)-2-benzimidazolecarbamic acid, methyl ester
1-(allyl carbamoyl)-2-benzimidazolecarbamic acid, methyl ester
1-(isobutyl carbamoyl)-2-benzimidazolecarbamic acid, methyl ester
1-(sec-butyl carbamoyl)-2-benzimidazolecarbamic acid, methyl ester
1-(hexyl carbamoyl)-2-benzimidazolecarbamic acid, methyl ester
1-(octyl carbamoyl)-2-benzimidazolecarbamic acid, methyl ester
1-(phenyl carbamoyl)-2-benzimidazolecarbamic acid, methyl ester
1-(p-tolyl carbamoyl)-2-benzimidazolecarbamic acid, methyl ester
1-(m-tolyl carbamoyl)-2-benzimidazolecarbamic acid, methyl ester
1-(p-methoxyphenyl carbamoyl)-2-benzimidazolecarbamic acid, methyl ester
1-(p-ethoxyphenyl carbamoyl)-2-benzimidazolecarbamic acid, methyl ester
1-(O-nitrophenyl carbamoyl)-2-benzimidazolecarbamic acid, methyl ester
1-(m-chlorophenyl carbamoyl)-2-benzimidazolecarbamic acid, methyl ester
1-(3,4-dichlorophenyl carbamoyl)-2-benzimidazolecarbamic acid, methyl ester
1-(p-cyanophenyl carbamoyl)-2-benzimidazolecarbamic acid, methyl ester
1-(benzyl carbamoyl)-2-benzimidazolecarbamic acid, methyl ester
1-(p-methoxybenzyl carbamoyl)-2-benzimidazolecarbamic acid, methyl ester
1-(cyclohexyl carbamoyl)-2-benzimidazolecarbamic acid, methyl ester
1-(O-methylcyclohexyl carbamoyl)-2-benzimidazole carbamic acid, methyl ester
1-(cyclohexylmethyl carbamoyl)-2-benzimidazolecarbamic acid, methyl ester
1-(methyl carbamoyl)-2-benzimidazolecarbamic acid, ethyl ester
1-(isopropyl carbamoyl)-2-benzimidazolecarbamic acid, ethyl ester
1-(butyl carbamoyl)-2-benzimidazolecarbamic acid, ethyl ester
1-(heptyl carbamoyl)-2-benzimidazolecarbamic acid, ethyl ester
1-(O-tolyl carbamoyl)-2-benzimidazolecarbamic acid, ethyl ester
1-(m-methoxyphenyl carbamoyl)-2-benzimidazolecarbamic acid, ethyl ester
1-(p-bromophenyl carbamoyl)-2-benzimidazolecarbamic acid, ethyl ester
1-(m-fluorobenzyl carbamoyl)-2-benzimidazolecarbamic acid, ethyl ester
1-(3-methylcyclohexyl carbamoyl)-2-benzimidazolecarbamic acid, ethyl ester
1-(ethyl carbamoyl)-2-benzimidazolecarbamic acid, isopropyl ester
1-(butyl carbamoyl)-2-benzimidazolecarbamic acid, isopropyl ester
1-(hexyl carbamoyl)-2-benzimidazolecarbamic acid, isopropyl ester
1-(p-nitrophenyl carbmoyl)-2-benzimidazolecarbamic acid, isopropyl ester
1-(O-methoxyphenyl carbamoyl)-2-benzimidazolecarbamic acid, isopropyl ester
1-(O-methylcyclohexylmethyl carbamoyl)-2-benzimidazolecarbamic acid, isopropyl ester
1-(methyl carbamoyl)-2-benzimidazolecarbamic acid, butyl ester
1-(hexyl carbamoyl)-2-benzimidazolecarbamic acid, butyl ester
1-(allyl carbamoyl)-2-benzimidazolecarbamic acid, butyl ester
1-(p-fluorobenzyl carbamoyl)-2-benzimidazolecarbamic acid, butyl ester
1-(isopropyl carbamoyl)-2-benzimidazolecarbamic acid, isobutyl ester
1-(pentyl carbamoyl)-2-benzimidazolecarbamic acid, isobutyl ester
1-(phenyl carbamoyl)-2-benzimidazolecarbamic acid, isobutyl ester
1-(p-methoxybenzyl carbamoyl)-2-benzimidazolecarbamic acid, isobutyl ester
1-(propyl carbamoyl)-2-benzimidazolecarbamic acid, sec-butyl ester
1-(octyl carbamoyl)-2-benzimidazolecarbamic acid, sec-butyl ester
1-(O-methoxybenzyl carbamoyl)-2-benzimidazolecarbamic acid, sec-butyl ester
1-(m-methylcyclohexyl carbamoyl)-2-benzimidazolecarbamic acid, sec-butyl ester
1-(ethoxy carbonyl)-2-benzimidazolecarbamic acid, methyl ester
1-(isopropoxy carbonyl)-2-benzimidazolecarbamic acid, methyl ester
1-(sec-butoxy carbonyl)-2-benzimidazolecarbamic acid, methyl ester
1-(ethoxy carbonyl)-2-benzimidazolecarbamic acid, ethyl ester
1-(propoxy carbonyl)-2-benzimidazolecarbamic acid, ethyl ester
1-(isobutoxy carbonyl)-2-benzimidazolecarbamic acid, ethyl ester
1-(methoxy carbonyl)-2-benzimidazolecarbamic acid, sec-butyl ester
1-(tert-butoxy carbonyl)-2-benzimidazolecarbamic acid, sec-butyl ester
2-benzimidazolecarbamic acid, ethyl ester
2-benzimidazolecarbamic acid, isopropyl ester
2-benzimidazolecarbamic acid, sec-butyl ester The compounds useful in the process of the invention are known and can be prepared by any of a variety of methods described in the art. The preparation of these compounds is described in detail in U.S. Pats. 2,933,504; 3,010,968 and French Pat. 1,523,597.

The benzimidazole compounds effectively increase the oxidative processes in sewage and soil. The proportion of the benzimidazole compounds in the sewage or soil is not critical and will vary in the range of 5 p.p.b. to 100 p.p.m. Higher concentrations are also effective, but it would be wasteful and uneconomical to use them. The preferred range for treating sewage is from 10 to 1000 p.p.b. and, for treating soil, from 0.1 to 50 p.p.m.

Although many techniques can be used, there are two preferred general methods for treating sewage with benzimidazole compounds and both take advantage of the low degree of solubility of these materials in water. In cases where continuous treatment is desired, a piece of equipment similar to an in-line cartridge filter is used; however, the cartridge filters are replaced with porous sacks which contain the benzimidazole compound and which have the same dimensions as the cartridge filter. This apparatus can be placed directly in the main sewage flow line to produce a saturated solution of the benzimidazole compound in the sewage, or in a by-pass line to produce lower than saturated concentrations when this stream is recombined with the main sewage stream. The second method involves batch addition of the benzimidazole compound to a tank and consists of immersing a porous container of the material in a tank of sewage. In aeration tanks, for example, the benzimidazole compound slowly dissolves and is blended with the contents of the tank by the turbulence caused by the rising bubbles.

For application to the soil, the benzimidazole compounds may be combined with a fertilizer or applied separately. The benzimidazole compounds can be combined with dry fertilizer ingredients by dry mixing in a rotating drum, or similar device. The benzimidazole compounds can also be dissolved in aqua ammonia and applied directly to the soil when this material is used as a fertilizer. In addition, the benzimidazole compounds may be formulated as wettable powders or in other suitable forms and applied without any other fertilizer ingredients. After application to the soil, the benzimidazole compounds will accelerate the nitrification rate of both fast release nitrogen fertilizers, such as ammonia, ammonium phosphate, ammonium nitrate, ammonium sulfate, urea, etc. and slow release nitrogen feritlizers, such as "Uramite," "Millorganite," etc.

In order that this invention may be better understood, the following examples are offered.

Example 1

A porous canvas bag containing about 3 pounds of 1 - (butylcarbamoyl) - 2 - benzimidazolecarbamic acid, methyl ester is suspended in the aeration tank of an activated sludge sewage treatment plant. The tank is filled with material from a settling tank and recycled sludge. Air enters the tank at the bottom and rises through the activated sludge as a series of fine bubbles. The action of the bubbles causes mixing to occur as the benzimidazole compound dissolves and the compound is thoroughly mixed throughout the tank.

Normally, the sewage would remain in the aeration tank for a period of 9–10 hours for an acceptable reduction in oxygen demand. However, the addition of the benzimidazole compound permits removal of the material from the tank after only 7 to 8 hours for the same reduction in oxygen demand. Because the additive is so insoluble, the actual concentration achieved is 1–3 p.p.m.

Example 2

A mixture containing 1.0% of 1 - (p-nitrophenylcarbamoyl) - 2 - benzimidazolecarbamic acid, methyl ester and urea is prepared by adding 1 part of the benzimidazole compound to 99 parts of shotted urea in a Patterson-Kelly twin shell dry blender. The urea is uniformly coated with the benzimidazole compound.

The mixture is tested to show its effect on corn grown in Canada where the growing season is short. The entire test plot is prepared by applying a broadcast application of 329 lbs./a. of 0–14–14 fertilizer to a nitrogen deficient area. Conventional procedures are used to prepare the ground and for planting the corn. The mixture is applied at rates to supply 0, 80 and 160 lbs. of nitrogen/a. Control plots are prepared in a similar manner using untreated shotted urea. The entire area is disced, harrowed and planted with corn with a single row planter.

The corn germinates and grows well on all plots, but during the early season growth, the corn fertilized with treated urea appears to grow more vigorously. As the season progresses, the corn fertilized with treated urea continues to appear marginally better than that in the control plots. A good yield of corn is obtained from the treated plots.

Example 3

A wettable powder formulation is prepared as follows

| | Parts |
|---|---|
| 1 - (p - tolylcarbamoyl) - 2 - benzimidazolecarbamic acid, methyl ester | 70.0 |
| Diatomaceous earth | 28.7 |
| Alkylaryl sodium sulfonates | 1.0 |
| Methyl cellulose | 0.3 |

The above ingredients are blended and micropulverized to a particle size below 50 microns.

The wettable powder is added to water at the rate of 454 gms. of active ingredient per 378 liters of water (0.03%). This material is tested in an early fall application of a nitrogen fertilizer on turf in Delaware. In this case, two 1000 sq. ft. plots of Marion Blue Grass are selected and fertilized by spreading "Uramite" nitrogen fertilizer so as to apply 2 lbs. N/1000 sq. ft. One plot was left untreated, but the other plot was sprayed with the above wettable powder formulation to apply about 0.03 lbs. of the benzimidazole compound per 1000 sq. ft. Both plots respond to the nitrogen treatment and grow well, but the plot treated with the benzimidazole compound appears to grow faster and to be greener. When the grass is cut and the clippings accumulated, it is confirmed that the benzimidazole compound accelerated the growth of the turf.

When any of the other benzimidazole compounds previously listed are used in this manner, similar results will be obtained.

Example 4

An aqueous suspension concentrate is prepared as follows:

| | Parts |
|---|---|
| 1 - (benzylcarbamoyl) - 2 - benzimidazolecarbamic acid, methyl ester | 30.0 |
| Polyacrylic acid, sodium salt | 0.35 |
| Low viscosity polyvinyl alcohol | 1.50 |
| Water and sodium hydroxide to a pH of 7.0, added last | 68.15 |

The active compound is ground to pass a 30-mesh screen and then mixed with the remaining formulation ingredients and mulled in a sand-grinder until the particle size is below 5 microns.

The above aqueous suspension is tested for effectiveness on a trickling filter. In this instance, the aqueous suspension is pumped into the sewage stream that feeds the rotary distributors on the trickling filter; the ratio of the two streams is such that the concentration of the benzimidazole compound is 10 p.p.b. in the sewage. The treatment period lasts one week. At the start of the treatment, the trickling filter is effective in reducing the oxygen demand of the sewage by 60%, but at the end of the treatment period, an 80% reduction in oxygen demand is recorded for the same throughput rate.

When any of the other benzimidazole compounds previously listed are used in this manner, similar results will be obtained.

Example 5

The procedure in Example 4 is repeated, except that the aqueous suspension is prepared with 1-(cyclohexylcarbamoyl)-2-benzimidazolecarbamic acid, methyl ester in place of the compound in the above example. Similar results are obtained.

Example 6

A mixture containing 0.5% of 1-(allylcarbamoyl)-2-benzimidazolecarbamic acid, ethyl ester (I) and ammonium sulfate (II) is prepared by dry blending 0.5 parts of (I) with 99.5 parts of (II) in a cement mixer. A uniform mixture is obtained.

The mixture is tested as a fertilizer for corn growth in Delaware where the growing season is adequate. A test plot having a nitrogen deficiency is selected and prepared by applying a broadcast application of 357 lbs./A of 0–14–14 fertilizer. Conventional practices are used to prepare the ground and for planting the seed. The mixture is then applied at rates of 75 to 150 lbs. nitrogen/A. Similar plots are prepared and fertilized with untreated ammonium sulfate and ammonium nitrate at rates of 75 to 150 lb. nitrogen/A. The entire area is disced, harrowed and planted with corn with a single row planter.

The corn germinates and grows well on all plots. The corn in the control plots does not appear to grow as vigorously during the early season as the corn in the plot treated with the benzimidazole compound. At the end of the season the yield from all of the plots is measured and shows that the best yield is obtained from the plot fertilized with 0.5% (I) or (II). That fertilized with ammonium nitrate gives the second best yield, while the ammonium sulfate alone produces the poorest yield.

Example 7

The procedure is the same as in Example 6 above, except that 1 - (p - methoxyphenylcarbamoyl) - 2 - benzimidazolecarbamic acid, isopropyl ester is used in place of (I) in that example. Similar results are obtained.

Example 8

The effectiveness of 2-benzimidazolecarbamic acid, methyl ester as a stimulant for the oxidation processes in sewage is demonstrated in the laboratory in a Warburg apparatus.

In order to carry out an experiment, three Warburg flasks are prepared. Each flask has a center well into which 0.2 cc. of 10% potassium hydroxide solution is placed and serves to remove carbon dioxide from the system. The first flask is used as a thermobarometer and also contains 1 cc. of distilled water. The second flask is used as a control and 1 cc. of sewage from the Wilmington, Del., Sewage Plant is placed in the sidearm. The sewage is the feed to the arobic digester, and has passed through primary and secondary settling tanks. The third flask also contains 1 cc. of sewage in the sidearm and, in addition, 0.0245 mg. of the benzimidazole compound is placed in the main portion of the flask (a solution had been prepared by dissolving 0.0049 grams of the compound in 100 cc. of dichloromethane and diluting 5 cc. of this solution to 10 cc.). One cc. of this solution is placed in the Warburg flask and evaporated to dryness.

The experiment is started by attaching each of the three flasks to manometers, placing them in a 30° C. constant temperature bath and shaking them at about 120 cycles per minute. After the flasks are heated to 30° C., the sewage is introduced to the main portion of the flask. Throughout the experiment the volume in the Warburg flasks, including the closed end of the manometer, is maintained at a constant value by manipulating the manometer fluid reservoir at the base of the manometer. Since the system is at constant temperature and volume, the utilization of oxygen manifests itself as a change in pressure which can be read at the open end of the manometer. The thermobarometer reading is used to correct the other readings for small changes in atmospheric pressure or temperature that affect all of the flasks in a similar manner.

In this particular experiment, manometer readings are taken over a 48 hour period. By applying the proper factors, the pressure readings at the open end of the manometer can be converted to the amount of oxygen utilized. The untreated sewage utilizes 105.1 $\mu$l. of oxygen in 24 hours and 140.7 $\mu$l. of oxygen in 48 hours. By contrast, the sewage containing 24.5 p.p.m. of the benzimidazole compound utilizes 130.5 $\mu$l. of oxygen in 24 hours and 168.0 $\mu$l. of oxygen in 48 hours.

Example 9

The experiment described in Example 8 is repeated with one change. In this case 0.0092 mg. 1-(butylcarbamoyl)-2-benzimidazolecarbamic acid, methyl ester is added to the flask in place of the 0.0245 mg. of 2-benzimidazolecarbamic acid, methyl ester used in the previous experiment. Manometer readings are taken over a 24-hour period and the untreated sewage utilizes 60.9 $\mu$l. of oxygen in 10 hours and 108.8 $\mu$l. of oxygen in 24 hours. The sewage containing 9.2 p.p.m. of this benzimidazole compound utilizes 69.9 $\mu$l. of oxygen in 10 hours and 119.7 $\mu$l. of oxygen in 24 hours.

Example 10

The experiment described in Example 8 is repeated with one major change. In this case 0.0098 mg. of 1-octylcarbamoyl-2-benzimidazolecarbamic acid, methyl ester is used in place of the 0.0245 mg. of 2-benzimidazolecarbamic acid, methyl ester used in the previous experiment. Manometer readings are taken over a 45 hour period and the untreated sewage utilizes 56.2 $\mu$l. of oxygen in 23 hours and 94.1 $\mu$l. of oxygen in 45 hours. The sewage containing 9.8 p.p.m. of this benzimidazole compound utilizes 90.3 $\mu$l. of oxygen in 23 hours and 159.0 $\mu$l. of oxygen in 45 hours.

Example 11

The experiment described in Example 8 is repeated with one change. In this case 0.0098 mg. of 2-benzimidazolecarbamic acid, methyl ester is used in place of the 0.0245 mg. used in the previous experiment. Manometer readings are taken over a 48 hour period and the untreated sewage utilizes 105.1 $\mu$l. of oxygen in 24 hours and 140.7 $\mu$l. of oxygen in 48 hours. The sewage containing 9.8 p.p.m. of this benzimidazole compound utilizes 134.4 $\mu$l. of oxygen in 24 hours and 176.4 $\mu$l. of oxygen in 48 hours.

Example 12

The experiment described in Example 8 is repeated with one change. In this case 0.00011 mg. of 2-benzimidazolecarbamic acid, methyl ester is used in place of the 0.0245 mg. used in the previous experiment. Manometer readings are taken over a 24 hour period and the untreated sewage utilizes 66.7 $\mu$l. of oxygen in 10½ hours and 115.3 $\mu$l. of oxygen in 24 hours. The sewage containing 0.11 p.p.m. of this benzimidazole compound utilizes 87.0 $\mu$l. of oxygen in 10½ hours and 144.3 $\mu$l. of oxygen in 24 hours.

Example 13

The effectiveness of 1-methoxycarbonyl-2-benzimidazolecarbamic acid, methyl ester (III) as an additive for increasing the nitrification rate is demonstrated in the laboratory as follows: Two groups of 21 Erlenmeyer flasks each and one group of 14 Erlenmeyer flasks are changed with 100 g. dry soil, 0.4 g. calcium carbonate, 1 g. unsterilized soil and 25.3 g. of water. The three groups are then separately charged as follows:

(1) No fertilizer added
(2) 94.5 mg. ammonium sulfate [$(NH_4)_2SO_4$], and
(3) 94.5 mg. $(NH_4)_2SO_4$ and 3.0 mg. (3.2%) of 1-methoxycarbonyl - 2 - benzimidazolecarbamic acid, methyl ester (III).

Nitrification is carried out by placing the samples in a 30° C. constant temperature room and maintaining the water content in each flask at a constant level throughout the test. At intervals, three flasks from each group of 21 and two flasks from the group of 14 are removed from the constant temperature room and analyzed for nitrate content by the phenoldisulfonic acid method. The net amount of nitrate developed from the $(NH_4)_2SO_4$ is obtained by subtracting the average amount of nitrate developed in the control samples without fertilizer from that developed in those containing fertilizer. The results are plotted in the figure and show that the nitrification rate of $(NH_4)_2SO_4$ is effectively increased with the addition of the benzimidazole compound.

Example 14

The experiment described in Example 8 is repeated with one change. In this case 0.047 mg. 1-(butylcarbamoyl) 2-benzimidazolecarbamic acid methyl ester is added to the flask containing the stimulant in place of the 0.0245 mg. of 2-benzimidazolecarbamic acid, methyl ester used in the first experiment. Manometer readings are taken over a 24-hour period and the untreated sewage bacteria consumes 60.9 µl. of oxygen in 10 hours and 108.8 µl. of oxygen in 24 hours. The sewage bacteria containing 47 p.p.m. of benzimidazole consumes 79.2 µl. of oxygen in 10 hours and 155.4 µl. of oxygen in 24 hours.

Example 15

In order to further test the effectiveness of benzimidazole compounds on increasing oxygen utilization by sewage bacteria, a large laboratory test was carried out in a "bench-scale bio-oxidation apparatus" (purchased from Pope Scientific, Inc.). This apparatus is a glass tank, capable of aerating 5 to 6 liters of liquid and is designed for either continuous or batch operation. In the experiment described below, raw sewage is mixed with synthetic sewage, diluted, and aerated in a batchwise manner for 24 hours. At regular intervals a sample is withdrawn from the apparatus and the Chemical Oxygen Demand (C.O.D.) is determined. The experiment is then repeated using all of the same ingredients plus a compound that may modify the sewage oxidation rate. The effectiveness of this compound is determined by comparing the reduction of C.O.D. for the treated sewage relative to that of the untreated sewage.

Using the above general procedure, the effect of 2-benzimidazolecarbamic acid, methyl ester on oxygen utilization by sewage bacteria was determined as follows: A synthetic sewage was prepared and contained: 0.30 g./l. urea, 1.80 g./l. powdered milk solids, 0.04 g./l. calcium chloride, 1.20 g./l. saturated starch solution, 0.30 g./l. magnesium sulfate, 0.60 g./l. gelatin, 0.04 g./l. potassium chloride and 0.3 g./l. ferric sulfate. Fifteen hundred cc. of the synthetic sewage and 1500 cc. of raw sewage from the Wilmington, Delaware, Sewage Treatment Plant were added to the Bench-Scale Bio-Oxidation Apparatus. The sewage mixture was diluted with 2500 cc. distilled water. The air pressure to the apparatus was adjusted to 3 p.s.i.g. and the air flow rate was controlled at 15 c.f.h. The mixture was sampled after the air had been bubbling through it for ½ hour and had an average C.O.D. of 319 mg./l. as determined by the method on pages 510 to 514, in the 12th edition of "Standard Methods for the Examination of Water and Waste Water," 1965. After operating under these conditions for 12½ hours, the sewage had an average C.O.D. of 180 mg./l.; and after 23 hours, the average C.O.D. was 111 mg./l.

The above experiment was repeated, charging the same quantities of the same materials into a clean Bench-Scale Bio-Oxidation unit. However, this time 28.0 mg. of 2-benzimidazolecarbamic acid, methyl ester was added to the sewage mixture before starting the air flow, and in a concentration of 5.1 p.p.m. The air pressure was 3 p.s.i.g. and the air flow was 15 c.f.h. After operating for ½ hour the average C.O.D. of the mixture was 351 mg./l. After 12 hours' operation the average C.O.D. was 125 mg./l., and after 24 hours' operation the average C.O.D. was 66 mg./ml.

The data show that the additive caused a more rapid and complete reduction in C.O.D. of the sample tested.

I claim:

1. A method for increasing the rate of biological oxidation of sewage by applying thereto an effective amount of the formula:

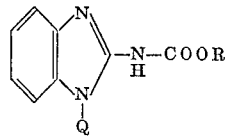

wherein R is alkyl of 1 through 4 carbon atoms;

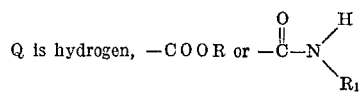

and $R_1$ is alkyl of 1 through 8 carbon atoms; alkenyl of 3 through 10 carbon atoms; phenyl; phenyl substituted with methyl, ethyl, methoxy, ethoxy, nitro, cyano or halogen; benzyl; benzyl substituted with methyl, nitro, methoxy or halogen; cyclohexyl; cyclohexyl substituted with methyl; or (cycloalkyl)alkyl of 7 through 8 carbon atoms.

2. The method of claim 1 wherein the compound applied is 1 - (butylcarbamoyl) - 2-benzimidazolecarbamic acid, methyl ester.

3. The method of claim 1 wherein the compound applied is 1-methoxycarbonyl-2-benzimidazolecarbamic acid, methyl ester.

4. The method of claim 1 wherein the compound applied is 2-benzimidazolecarbamic acid, methyl ester.

References Cited

UNITED STATES PATENTS 3,010,968  11/1961  Loux _____ 260—309.2
2,933,504   4/1960  Klopping _____ 260—309.2

REUBEN FRIEDMAN, Primary Examiner

R. BARNES, Assistant Examiner

U.S. Cl. X.R.

71—27.92